March 12, 1957  R. S. CORCORAN  2,784,987
PIPE COUPLING WITH DETENT MEANS
Filed Feb. 3, 1954  2 Sheets-Sheet 1
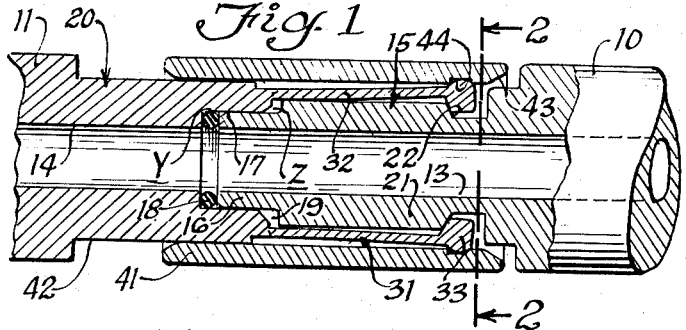
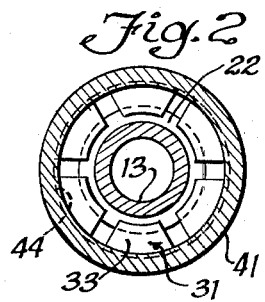
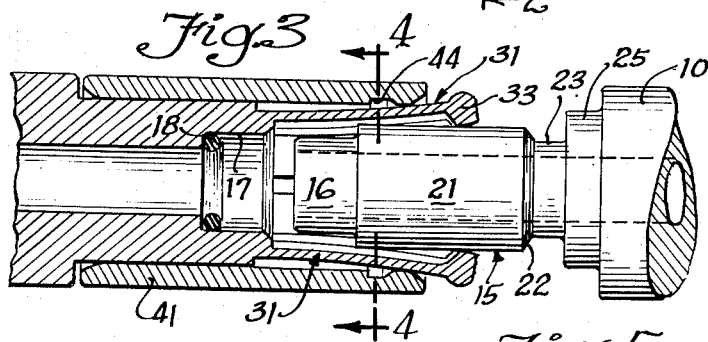
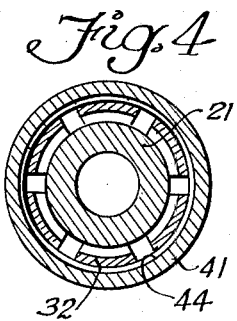
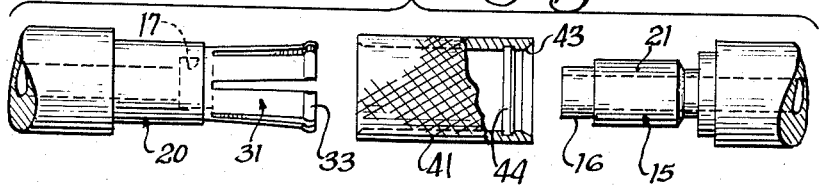
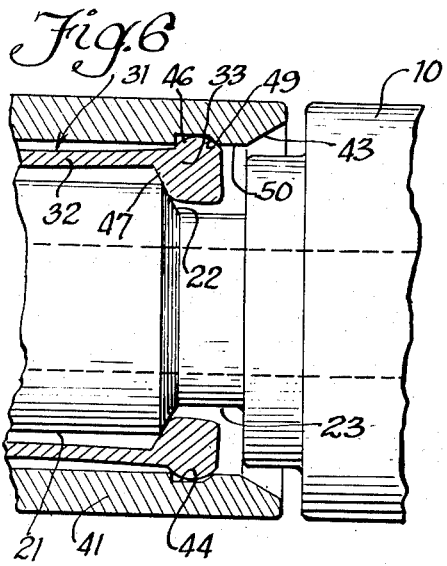
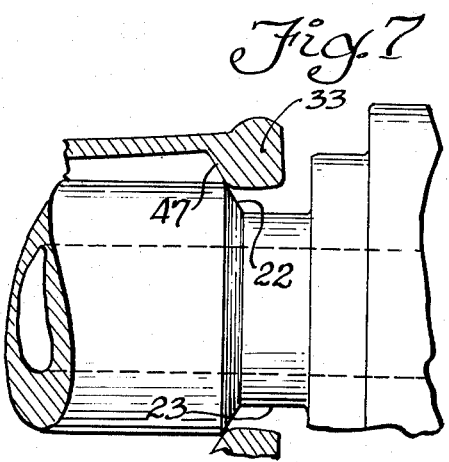
INVENTOR.
Richard Stanley Corcoran
BY
Att'y

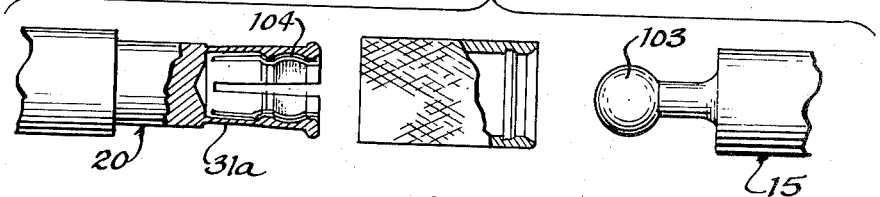
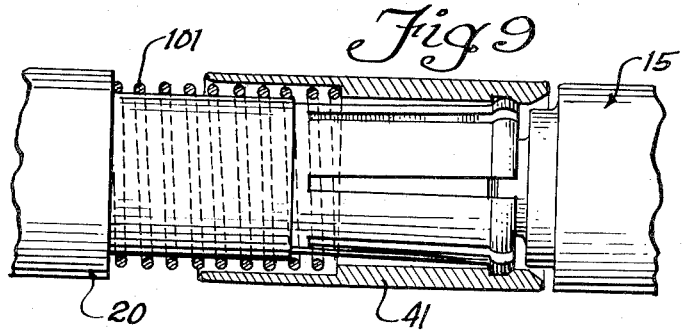
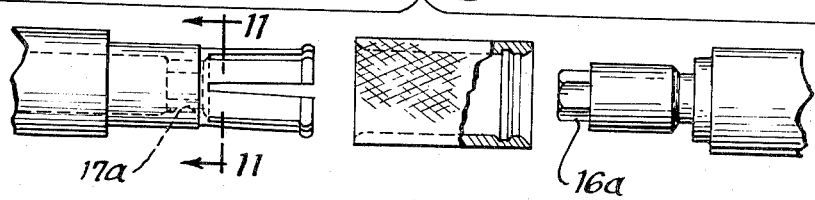
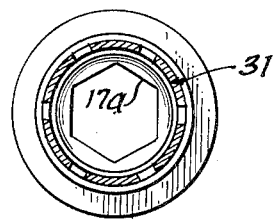

United States Patent Office 2,784,987
Patented Mar. 12, 1957

2,784,987

PIPE COUPLING WITH DETENT MEANS

Richard Stanley Corcoran, Joliet, Ill.

Application February 3, 1954, Serial No. 407,885

1 Claim. (Cl. 285—87)

This invention relates to a rapidly connectible and disconnectible device for coupling two substantially axially aligned members. Specifically, the same relates to a device capable of being operated without the use of tools and yet is proof against release by vibration or other unintentional force.

Couplings of the general character disclosed herein are known, but those with which I am familiar incorporate devices for locking the coupling which require either some troublesome manipulation during coupling and uncoupling or are unduly complicated, and therefore expensive and difficult to maintain. There is presently a considerable demand for a so-called "quick detachable" coupling which is simple, inexpensive, operable without tools and easily adaptable to manifold environments.

Accordingly, a principal object of this invention is to provide a device for coupling a pair of members which may each be regarded as having an axis, not necessarily aligned, and which may be operated and positively maintained in coupled condition without the use of tools.

A further object lies in achieving the foregoing object in connection with the coupling of fluid conduits.

Still another object is to provide a device in accordance with the foregoing wherein the number of parts is an irreducible minimum.

A further object is to provide a device as aforesaid which is capable of fabrication in virtually any material including those which are non-metallic, e. g., plastic compositions and glass.

Other objects will appear from the following description which, taken with the accompanying drawings, discloses certain preferred forms in which the invention may be embodied in practice.

In these drawings:

Fig. 1 shows a form of the coupling as adapted to fluid conduits although, in this form, not necessarily so limited, and in coupled condition;

Fig. 2 shows a transverse cross section taken on the line 2—2 of Fig. 1;

Fig. 3 shows that form of the coupling illustrated in Fig. 1, but in the process of being coupled or uncoupled;

Fig. 4 is a transverse cross section on the line 4—4 of Fig. 3;

Fig. 5 is an exploded side elevation of the device of Fig. 1;

Fig. 6 shows an enlarged portion of Fig. 1 to show more clearly the nature of the locking fingers and grooves;

Fig. 7 shows an enlarged detail similar to that of Fig. 6, but indicating the fingers just outside the inner groove;

Fig. 8 is an exploded view to show an alternative embodiment of the invention;

Fig. 9 shows still another embodiment in coupled condition;

Fig. 10 is also an exploded view of still another embodiment; and

Fig. 11 shows a cross section taken on the line 11—11 of Fig. 10.

Broadly regarded the invention, in one aspect, comprehends the provision of means for detachably securing a pair of members which are substantially axially aligned and by the inclusion of an operating member capable of being actuated by a moderate degree of manual force and without the intervention of tools or implements of any kind. To this end one of the coupled members is provided at its extremity with an enlargement defining a shoulder and the other member is provided with a plurality of fingers having radial freedom over a range which permits the same to be constituted as resilient cantilevered elements or as pivoted elements. A sleeve is arranged to slide over the fingers and is so contoured interiorly as to allow the fingers outward radial freedom when the sleeve is moved to uncouple the members, and is provided with an inner groove engageable over protruding portions on the outer surface of the fingers to lock the sleeve in place when the same is moved to coupling position. Alternatively the groove may be omitted if the sleeve is intended to be operated at frequent intervals and the positive locking feature assumes lesser importance. In the case of fluid conduits the gasket or packing ordinarily employed may be of a resilient character in which case the same may be compressed to facilitate to some extent uncoupling of the device. In another aspect the invention contemplates the coupling of members having some significant degree of angular misalignment by forming portions of the extremities of the coupled members as a ball and socket joint. As thus constituted axial compression or tension may be transmitted through the coupling from one member to the other. By utilizing splines or other features capable of providing a quasi-universal joint this form of the invention may, for small angular misalignments, combine rotation with the axial force transmitting function, or a strictly rotational type of coupling may be satisfied by utilizing splines or their equivalent without the use of a ball-and-socket joint.

Turning now to the drawings there are shown members 10 and 11 which are to be coupled. While in this, as well as other embodiments to be described, the parts of the invention per se will, for convenience in description, be alluded to as integral with the coupled members it will be understood that the invention may be embodied as separate means attachable, in any desired manner, to the coupled members, as by screw threads, swaging, pinning, etc. Furthermore, while the coupled members are illustrated as fluid conduits having coaxial passages 13 and 14 it will also be understood that the coupled members may be solid. Additionally, one of the members may be rigid, and the other a section of flexible shafting or both may be rigid or flexible.

At its extremity the male coupling part 15 may be provided with a pilot 16 entering a cavity 17 in the female member 20 for ease in mutually centering the coupling parts, there being an O ring 18 of rubber or an equivalent resilient packing element between the two coupling members which may be of such consistency as to allow a small relative axial shift therebetween for a purpose to be described while exerting the resilient force necessary for a fluid-tight joint. It will be noted that the parts are so designed as to define a small annular space 19 thereby to allow approach of the coupling members against the resiliency of the element 18.

Male member 15 is provided with an enlargement 21, the inner boundary 22 whereof is preferably inclined as a surface of a conical frustum but which may be some other element of a surface which is equally adapted to the intended function to be described. A clearance space 23 is provided between the surface 22 and the adjacent portion 25 of the member 10 to permit unimpeded action of the coupling fingers.

The female coupling member 20 is provided with a plurality of fingers 31 (in this case six in number), each including a body portion or shank 32 terminating in a head 33. In order to impart the necessary resiliency to the fingers 31 any suitable material may be employed, e. g., metal, plastic composition, glass, etc. Alternatively the fingers may be individually pivoted at their respective bases in which case outwardly active biasing means are then employed. The invention parts are so designed and their function is such as to confine radial movement of the extremities to the fingers over a small range which is calculated not to exceed the elastic limit of the material.

An operating sleeve 41 is arranged to slide upon a corresponding portion 42 of the member 20 and incorporates an inner chamfer 43 and an interior circumferential groove 44.

Turning particularly to Fig. 6, the head 33 is shown as incorporating an exterior camming surface 46 and interior camming surface 47. The surface 46 may be convex, as shown, or differently contoured, the desideratum being that coaction with the groove will be of a camming nature effective to thrust the head 33 radially inwardly as the sleeve is moved toward uncoupling position. To this end the forward margin of the groove 44 is beveled or otherwise sloped at 49 and, to facilitate movement of the sleeve to coupling position the inner end of the sleeve 41 is chamfered at 43. A camming surface 47 is provided on each head 33 for cooperation with the beveled surface 22 of the enlargement 15. To facilitate manipulation the exterior of the sleeve 41 may be knurled or provided with a similar frictional surface.

As thus far described operation is as follows: Assuming the parts are to be coupled the sleeve 41 will have been assembled with the female coupling member 20 and therewith retained by the inherent outward bias of the fingers 31, the parts then occupying the relative position seen in Fig. 3. The male member 10 is then thrust into position until the pilot 16 bottoms on the packing 18. However, as will become apparent hereinafter, such packing is not essential to the functioning of the invention. At this point the heads 33 will substantially overlie the clearance space (Fig. 7). Subsequently the sleeve is moved to the right, the chamfer 43 riding over the camming surface 46 (Fig. 7) to force the several heads 33 into the clearance space 23 and their several surfaces 47 against the surface 22, whereupon the groove 44 will have moved into a position to receive the heads 33 in the manner best seen in Fig. 6. The coupling is now operative and the sleeve 41 is locked (Fig. 1). In order that that portion of the sleeve indicated at 50, intermediate the chamfer 43 and groove 44 may move over the heads 33 (these latter at this point being substantially in what may be termed an "overtravelled" position within the clearance 23), the male member 10 must be allowed to displace to the left a small amount as directed by the abutting surfaces 47 and 22. Such condition is provided for by the resilient element 18 which will compress sufficiently to avoid the potential binding action momentarily occurring during coupling and uncoupling but which, upon coupling, is transformed into an actual binding action to maintain the coupled parts and the sleeve in operative relation. It will be seen from Fig. 6 that axial force exerted to the right by the element 18 acts against the enlargement 21 which, through surface 22 supplements the normal outward bias of the fingers whereby the heads 33 are more positively held in the groove 44.

While the use of the resilient means represented by the element 18 provides supplementation of the force retaining the sleeve 41 in its active position it is possible to obtain positive positioning of the sleeve without the same. Thus, referring to Fig. 6, the adjoining surfaces 22 and 47 may lie in a common plane which is normal to the axis of the coupling, or substantially so, in order that movement of the fingers about their respective points of support may occur without exerting a camming force tending to thrust the male portion 21 toward the left. Stated otherwise if the parts are to be without axial play when assembled then, in the coupling position, the play afforded by the packing 18 must be absent and the male member must be bottomed on the female member. Under that circumstance no camming action between the surfaces 22 and 47 can be tolerated. However, the desired coupling function can be attained concurrently with retention of the sleeve if the surfaces 22 and 47 are arranged to permit deformation inwardly of the heads 33 as the sleeve 41 is moved to coupling position. Accordingly, such surfaces may correspond to a plane normal to the coupling axis or substantially to a spherical zone of which the radius is measured from the center about which the finger is assumed to pivot. The degree of engagement of the several surfaces 46 within the groove 44 need be only of a shallow degree adequately to retain the sleeve against inadvertent dislodgment, and such engagement is so proportioned as to allow shifting of the sleeve by the use of moderate manual force. While, exemplificatively, the groove 44 is shown as trapezoidal in cross section other forms may be found equally effective, e. g., triangular, in which a longer side forms the leading wall of the groove and a shorter side the trailing wall, the angle of the leading wall with the interior straight, cylindrical wall of the sleeve being acute and of the trailing wall being less acute in order that the surface 46 may be readily cammed inwardly upon unlocking and yet will prevent overtravel of the sleeve to the right as the same is moved to locking position.

In Fig. 9 there is shown an alternative embodiment in which a compression spring 101 is employed to assist the locking of the sleeve by the means just detailed. Such implementation may be dictated as an additional factor of safety for those installations subject to heavy vibration. The mode of incorporating this spring is believed to be apparent from the figure.

Fig. 8 illustrates the modification required to adapt the invention to a coupling for members which may be subject to angular misalignment. Here the male member is provided with a substantially spherical head 103 which is interengageable with a congruent socket 104 formed within the fingers. Otherwise the parts and their function remain as in the principal embodiment. If desired the organization of Fig. 8 may be incorporated in fluid conduits, in which event a packing will be employed intermediate the female member 20 and the head 103 in a manner believed to be well understood.

Alternatively the form of the invention of Fig. 8 may be used for members which are only slightly angularly misaligned and which are rotatable. In this case a key and keyway or splines may be employed between the head 103 and its socket 104 whereby to transmit rotation from one member to the other.

Another embodiment is shown in Figs. 10 and 11 wherein the coupled members are assumed to be in substantially true axial alignment and torque is transmitted through the coupling. Here the pilot 16 of Fig. 1 becomes a splined member 16a received in a corresponding recess 17a. Otherwise the parts entering into the coupling function per se remain as before, and as will be obvious from the drawing.

It will be observed that, in connection with any of the several embodiments described, the portion of the sleeve 41 extending to the right of the groove 44 may extend as far as desired in order that the fingers 31 may remain concealed within the sleeve even when the same is in its disengaged position. Such feature is of advantage in environments where it is desired to remove the male member for a protracted period and the parts within the sleeve are to be protected as much as possible against entry of foreign matter.

It will be understood that peripheral continuity of the clearance groove 23 and/or groove 44 is not essential inasmuch as each of the fingers 31 may be provided with individual cavities functioning equivalently to the continuous grooves.

The invention is characterized by the utmost simplicity for a device of this character since it comprises, in its basic form, only three parts. Being positive in its coupled condition the device is ideally suited to those applications where vibration is encountered, for example, aircraft, thereby eliminating the need for safety wiring while allowing the frequent connecting and disconnecting of flexible cables and other parts which are subjected to frequent inspection and maintenance. The coupling requires no lubrication or special protection against malfunction due to corrosion but, should this occur under extreme conditions the use of a pipe wrench on the sleeve is calculated to free the same without hazard inasmuch as the fingers 31 may flex sufficiently to allow the jam to be broken whereupon they may resume their normal operative location.

While I have shown particular embodiments of my invention, it will be understood, of course, that I do not wish to be limited thereto, since many modifications may be made, and I therefore contemplate by the appended claim to cover any such modifications as fall within the true spirit and scope of my invention.

I claim:

A coupling for detachably securing two parts on a common axis comprising a male member adapted to form the coupling termination of one of the parts and a female member to receive the male member adapted to form the termination of the other part, said female member including a plurality of independently-movable, axially extending, cantilever mounted fingers each including a resilient shank and an integral head at the distal end thereof confronting the male part and normally biased outwardly, said head protruding from the finger toward the axis and defining with the finger a shoulder inclined toward the axis and outwardly of the finger, said male member having a peripheral shoulder inclined complementally to the inclination of the several heads for engagement thereby when the parts are coupled, means defining substantially radially disposed, confronting abutments on the male and female members respectively, resilient means interposed between said abutments to provide separating force biasing the male and female members apart, a sleeve mounted for axial sliding movement of one of said male and female members and adapted, when moved to a coupling position, to converge said fingers as a group to force the inclined shoulders of the several heads over the said shoulder to couple said male and female members, said resilient means providing axial force camming the said shoulders relatively to each other outwardly and forcing the fingers into frictional engagement with the sleeve to retain the same in coupling position over the fingers, said fingers each also being provided with an outwardly directed, integral protuberance adjacent the distal end, said sleeve having an interior peripheral groove for forcible engagement over said protuberances upon movement of said sleeve to coupling position to retain said sleeve in said latter position subject to subsequent displacement therefrom for disengagement of said heads from shoulder-engaging position, and said male member, in the region of said fingers, having a transverse cross section sufficiently smaller than the interior cross sectional area of the sleeve for flexure of said fingers in order that said fingers may be deformed momentarily during axial movement of said sleeve and then restored when engagement of said heads and protuberances respectively occur.

References Cited in the file of this patent

UNITED STATES PATENTS

| | | |
|---|---|---|
| 1,315,484 | Fesler | Sept. 9, 1919 |
| 2,457,523 | Bird | Dec. 28, 1948 |
| 2,485,763 | Moon | Oct. 25, 1949 |
| 2,490,363 | Lang | Dec. 6, 1949 |
| 2,675,829 | Livers | Apr. 20, 1954 |